US007716061B2

(12) United States Patent
Keohane et al.

(10) Patent No.: US 7,716,061 B2
(45) Date of Patent: May 11, 2010

(54) METHOD AND APPARATUS FOR OBTAINING STATUS INFORMATION IN A GRID

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1696 days.

(21) Appl. No.: 10/401,323

(22) Filed: Mar. 27, 2003

(65) Prior Publication Data

US 2004/0193461 A1 Sep. 30, 2004

(51) Int. Cl.
*G06Q 99/00* (2006.01)
(52) U.S. Cl. .......................................................... 705/1
(58) Field of Classification Search ........................ 705/1
See application file for complete search history.

(56) References Cited

U.S. PATENT DOCUMENTS

| | | | | |
|---|---|---|---|---|
| 5,982,780 A | * | 11/1999 | Bohm et al. ................ | 370/450 |
| 6,173,068 B1 | * | 1/2001 | Prokoski .................... | 382/115 |
| 6,529,617 B1 | * | 3/2003 | Prokoski .................... | 382/128 |
| 6,614,882 B1 | * | 9/2003 | Beamon et al. ........... | 379/27.01 |
| 6,750,766 B1 | * | 6/2004 | Heitner et al. ............. | 340/525 |
| 6,904,335 B2 | * | 6/2005 | Solomon .................... | 700/247 |
| 7,171,654 B2 | * | 1/2007 | Werme et al. .............. | 717/130 |
| 7,246,140 B2 | * | 7/2007 | Therrien et al. ............ | 707/202 |
| 2004/0019514 A1 | * | 1/2004 | Verbeke et al. ............ | 705/9 |
| 2004/0019890 A1 | * | 1/2004 | Verbeke et al. ............ | 718/100 |
| 2004/0098447 A1 | * | 5/2004 | Verbeke et al. ............ | 709/201 |
| 2004/0148326 A1 | * | 7/2004 | Nadgir et al. .............. | 709/200 |

FOREIGN PATENT DOCUMENTS

| | | |
|---|---|---|
| JP | 05113963 | 5/1993 |
| JP | 2002049587 | 2/2002 |
| JP | 2002366389 | 12/2002 |

(Continued)

OTHER PUBLICATIONS www.globus.org, Globus Toolkit History.*

(Continued)

*Primary Examiner*—Jonathan Ouellette
(74) *Attorney, Agent, or Firm*—Yee & Associates, P.C.; Diana R. Gerhardt

(57) ABSTRACT

The present invention provides a method, apparatus, and computer instructions for obtaining status information for processes executing in a grid. Responsive to a submission of a job from the data processing system to a remote node on the grid, a job identifier is received from the remote node. The job identifier is saved in a set of job identifiers. Responsive to a request for a status of jobs submitted from the data processing system, a job status request for each job identifier in the set of job identifiers for processes still executing is submitted using the set of job identifiers to form a set of job status requests. Responses to the set of job status requests are received. The responses are then presented.

32 Claims, 5 Drawing Sheets

FOREIGN PATENT DOCUMENTS

JP      2003018308      1/2003

OTHER PUBLICATIONS

USC (Argonne National Laboratory—USC Information Sciences Institute, "GRAM: Grid Resource Allocation & Management," Globus Toolkit Development Tutorial, The Globus Project, Mar. 25, 2002).*

Stelling et al., "A Fault Detection Service for Wide Area Distributed Computations", Computer Science and Engineering, vol. 2, No. 2, Sep. 1999, pp. 117-128.

* cited by examiner

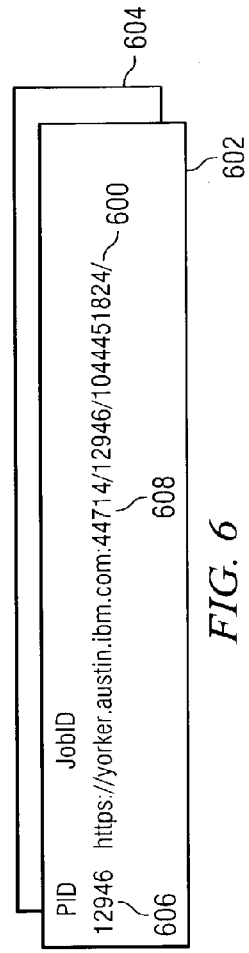

```
Command my-job-submit
#! /bin/ksh
GJD=$HOME/.globus_job  # Globus Job Directory                    1200 submit the job and save the RSL return string

RSL=`globus-job-submit $*`
RC=$?
echo $RSL if [ $RC -ne 0 ]
then
      exit $RC
fi MACHINE=`echo $RSL | \
sed 's/https:\/\///' | awk ' {print $1}' FS=:`

PID=`echo $RSL | \
   awk ' {print $4}' FS=/` echo $MACHINE
if [ ! -d $GJD ] ; then
      mkdir $GJD
fi
echo "$PID $RSL" >> $GJD/$MACHINE
```

*FIG. 12*

```
#! /bin/ksh

GJD=$HOME/.globus_job  # Globus Job Directory                    1300 for MACHINE in `ls $GJD`
do
    PID_LIST=`awk '{print $1}' < $GJD/$MACHINE`
    GREP_LIST=`echo $PID_LIST | sed 's/ /|/g'`
    globusrun -o -r $MACHINE ' &(executable=/bin/ps) (arguments=-efl) ' | egrep $GREP_LIST
done
echo $PID_LIST
exit 0
```

*FIG. 13*

METHOD AND APPARATUS FOR OBTAINING STATUS INFORMATION IN A GRID

BACKGROUND OF THE INVENTION

1. Technical Field

The present invention relates generally to an improved data processing system and in particular to an improved method and apparatus for processing data. Still more particularly, the present invention provides a method and apparatus and computer instructions for obtaining status information from nodes in a grid.

2. Description of Related Art

Network data processing systems are commonly used in all aspects of business and research. These networks are used for communicating data and ideas as well as providing a repository to store information. Further, in many cases the different nodes making up a network data processing system may be employed to process information. Individual nodes may have different tasks to perform. Additionally, it is becoming more common to have the different nodes work towards solving a common problem, such as a complex calculation. A set of nodes participating in a resource sharing scheme is also referred to as a "grid" or "grid network". For example, nodes in a grid network may share processing resources to perform a complex computation, such as deciphering keys.

The nodes in a grid network may be contained within a network data processing system, such as a local area network (LAN) or a wide area network (WAN). These nodes also may be located in different geographically diverse locations. For example, different computers connected to the Internet may provide processing resources to a grid network. By applying the use of thousands of individual computers, large problems can be solved quickly. Grids are used in many areas, such as cancer research, physics, and geosciences.

A user may submit jobs to be run remotely on other nodes in the grid. These jobs are typically submitted to a server process, such as a grid resource application management (GRAM) service. A grid resource application manager allows for programs to be started on remote resources, even if those resources run on different platforms.

At some point in time, the user receives results from the processing of jobs. The present invention recognizes that oftentimes a user may desire to obtain status information on the processing of these jobs on the remote nodes before results are received. Currently, such a feature is unavailable with respect to this type of distributed processing of jobs.

Therefore, it would be advantageous to have an improved method, apparatus, and computer instructions for obtaining status information on jobs executing remote nodes in network data processing system.

SUMMARY OF THE INVENTION

The present invention provides a method, apparatus, and computer instructions for obtaining status information for processes executing in a grid. Responsive to a submission of a job from the data processing system to a remote node on the grid, a job identifier is received from the remote node. The job identifier is saved in a set of job identifiers. Responsive to a request for a status of jobs submitted from the data processing system, a job status request for each job identifier in the set of job identifiers for processes still executing is submitted using the set of job identifiers to form a set of job status requests. Responses to the set of job status requests are received. The responses are then presented.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram of a response to a my-job-submit command in accordance with a preferred embodiment of the present invention;

FIG. 6 is a diagram of an entry used for obtaining status information in accordance with a preferred embodiment of the present invention;

FIG. 7 is a diagram of a response containing status information in accordance with a preferred embodiment of the present invention;

FIG. 8 is an example of a display of job status information in accordance with a preferred embodiment of the present invention;

FIG. 12 is a diagram illustrating pseudo code for a my-job-submit command in accordance with a preferred embodiment of the present invention; and FIG. 13 is a diagram illustrating pseudo code for a grid process status command in accordance with a preferred embodiment of the present invention.

DETAILED DESCRIPTION OF THE PREFERRED EMBODIMENT

Figure 1:
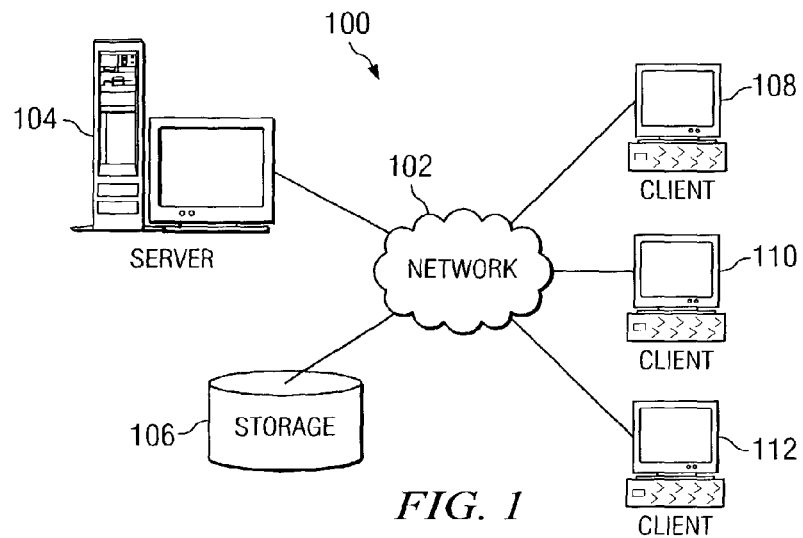
FIG. 1 depicts a pictorial representation of a network of data processing systems in which the present invention may be implemented.

With reference now to the figures, FIG. 1 depicts a pictorial representation of a network of data processing system in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages of course, network data processing system 100 also may be implemented as a number of different types of networks, such as for example, an intranet, a local area network (LAN), or a wide area network (WAN). FIG. 1 is intended as an example, and not as an architectural limitation for the present invention. The different servers and clients within network data processing system 100 are also referred to as nodes.

Figure 2:
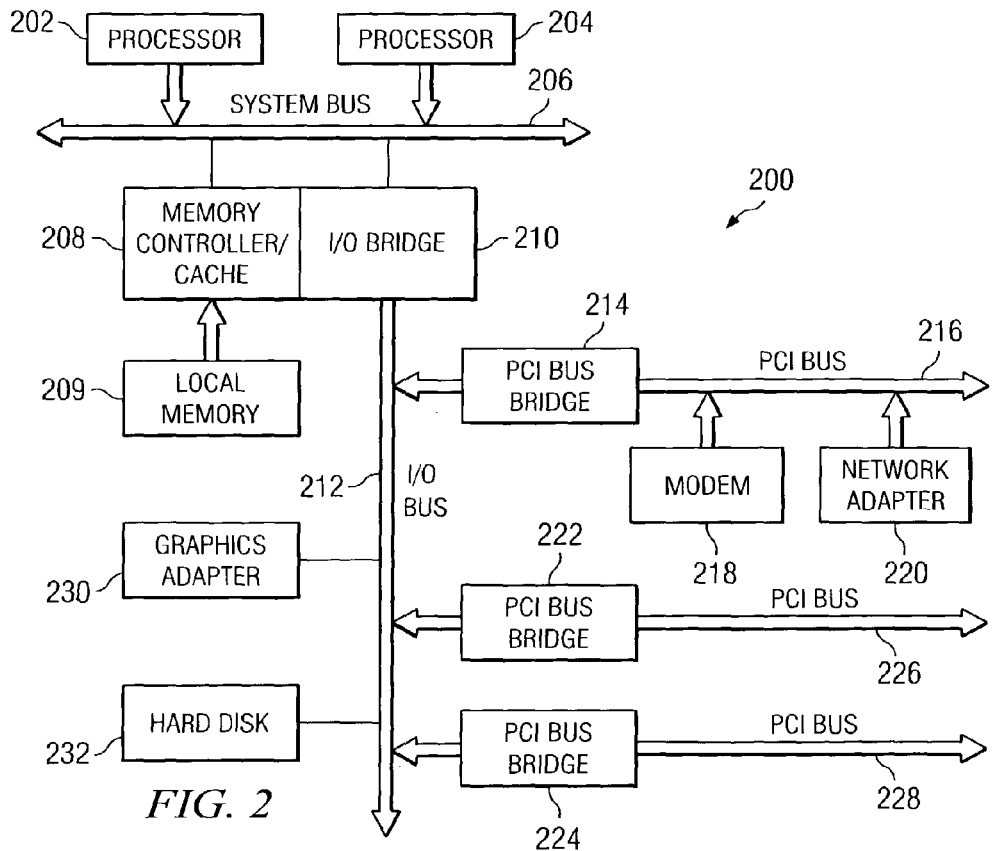
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
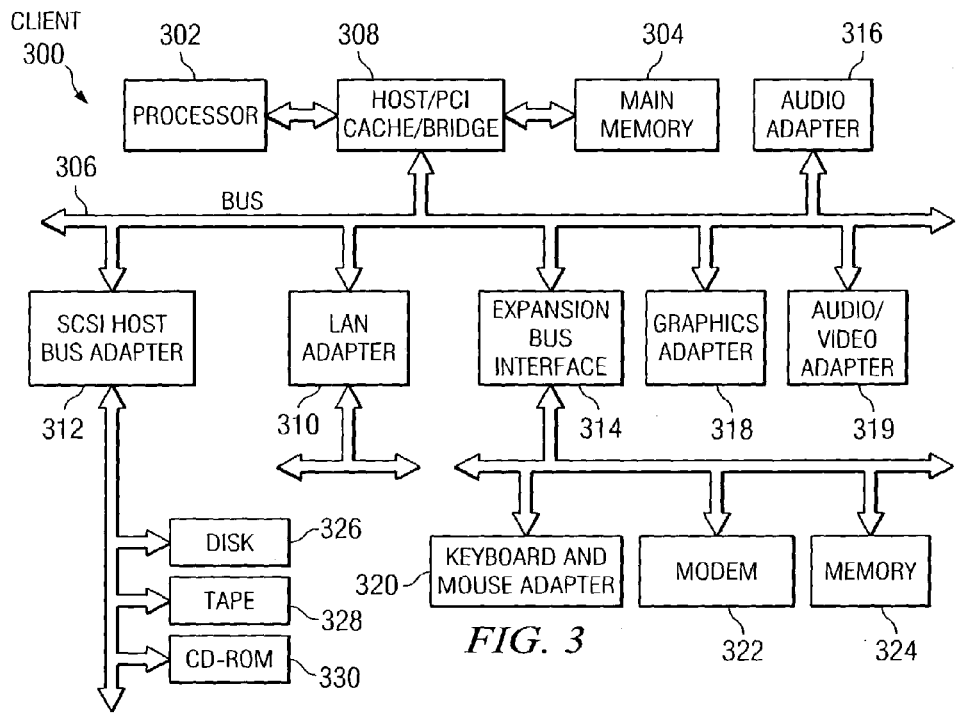
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. As a further example, data processing system 300 may be a personal digital assistant (PDA) device or a notebook computer.

The present invention provides a method, apparatus and computer instructions for obtaining status information on processes executing jobs within a grid. The mechanism of the present invention provides an ability at a node to obtain status information on jobs, executing on a remote node in the grid. The mechanism of the present invention involves storing job identifiers returned when jobs are submitted for execution. Currently, no such process is available for saving these job identifiers and using those identifiers to obtain status information on processes, executing on remote nodes. This job identifier is used to send requests to obtain status information for remote processes. This mechanism provides an extension to a presently available UNIX command "ps" which is used to check the process status locally. The mechanism of the present invention provides an ability to obtain information for processes executing remotely.

Figure 4:
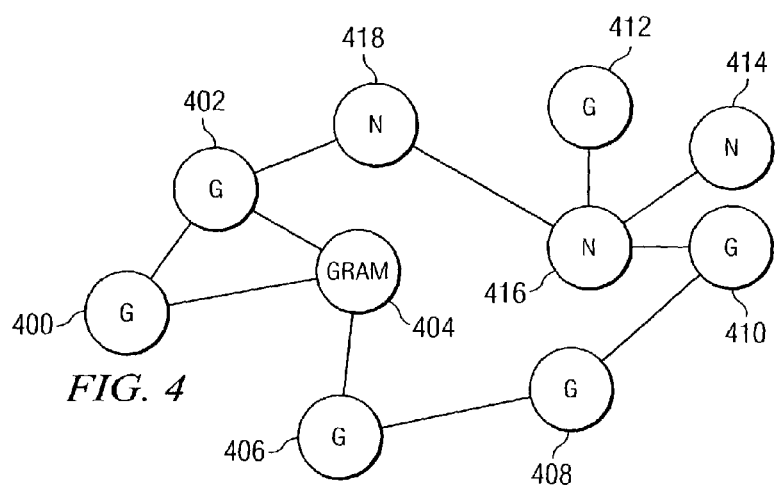
FIG. 4 is a diagram illustrating components in a grid in accordance with a preferred embodiment of the present invention.

With reference now to FIG. 4, a diagram illustrating components used in distributing logical units in a network data processing system is depicted in accordance with a preferred embodiment of the present invention. In this example, nodes 400, 402, 404, 406, 408, 410, and 412 are nodes in a grid. Nodes 414, 416, and 418 are nodes that are not part of the grid.

These nodes may be located in a network data processing system such as network data processing system 100 in FIG. 1. In this example, these nodes are all nodes that are part of the Internet.

The different nodes in the grid are connected to each other through grid processes. These processes may be a tool kit, such as, for example, Globus Toolkit 2.2, available from the Globus Project at www.globus.org. The Globus Project is a research and development project focused on enabling the application of grid concepts to scientific and engineering computing. Although the examples and commands illustrated in these embodiments are for use with the Globus Toolkit 2.2, other types of grid processing software may be used depending on the particular implementation.

In this example, node 404 may serve as a grid resource application management (GRAM) service for receiving requests and distributing applications for different nodes for execution. Node 404 receives requests from users. These requests are received when a user first signs on with a passphrase, attaching a digital certificate that will be associated with all programs that the user attempts to execute. An application is then selected from an execution application manager. Further, one or more nodes may be selected for execution, along with any other necessary remote resources.

For example, a user at node 400 submits one or more jobs for execution to node 404. Node 404 selects one or more nodes to process the jobs. A job is any task or executable program that can be monitored. A "task" may be a sensor or other mechanism. Grid computing is designed as to leverage non-computer-programs. For example, the status of a Grid attached mechanism that is invoked to pound nails may be gathered in which this mechanism reports back the number of nails. This does bring up the possibility that such mechanisms may need to report the method of attaining process status when the process is invoked. For example, when the job is submitted to the Grid node called "Nail-pounder", this node reports back that the program "number-pounded-status" is the status program to call when status of the job is desired.

In these examples, a job is submitted to the grid using a globus-job-submit request or command. As part of this process, node 404 will select the appropriate application that is needed to process the job at the selected nodes. For example, nodes 408 and 410 may be selected as nodes to process the jobs submitted from node 400. Thereafter, node 404 then sends the job with the appropriate application to nodes 408 and 410 for execution.

A user at node 400 may desire to obtain the status of the jobs being processed by nodes 408 and 410. In these examples, a mechanism of the present invention provides an additional command, a grid process status (GPS) command, to allow node 400 to obtain status information on jobs processing on a remote node. This mechanism only requires modifications to the client at which the status information is desired. No changes to server processes, such as the GRAM services provided by node 404 are required.

In generating a grid process status command at node 400, a job is submitted to the grid via globus-job-submit. In this example, the job is submitted to node 404. This command is enabled by information stored when jobs are requested. The mechanism of the present invention includes a "my-job-submit" command. When a job is submitted to the grid using this command, the mechanism of the present invention creates a wrapper that is placed around the globus-job-submit to read the return resource specification definition language (RSL) string returned by globus-job-submit. RSL provides a common interchange language to describe resources. The various components of the Globus Resource Management architecture manipulate RSL strings to perform their management functions in cooperation with the other components in the system. The RSL provides the skeletal syntax used to compose complicated resource descriptions, and the various resource management components introduce specific <attribute, value>pairings into this common structure. Each attribute in a resource description serves as a parameter to control the behavior of one or more components in the resource management system.

In these examples, the wrapper is referred to as a wrapper "my-job-submit". My-job-submit command will create a file $HOME/.globus_job/<remote_hostname>, if such a file <remote_hostname>does not exist on the node submitting the job. When the response is returned, the remote hostname is taken from the return RSL string. The remote processes ID also is extracted from the RSL string is stored in the file $HOME/.globus_job/<remote_hostname>file.

Later, when a user desires to obtain status information, the user enters the command "gps". This command reads all files in the $HOME/.globus_job directory. Thereafter, the command issues a remote job to these hosts to get the processes status of jobs running on these hosts and searches for the corresponding process ids stored in the associated $HOME/.globus_job/<remote_hostname>file. In the illustrated examples, these job requests may be sent directly to the nodes or through a grid server process depending on the particular implementation.

In this example, node 400 may be implemented using a server, such as data processing system 200 in FIG. 2. Other nodes may be implemented using a data processing system, such as data processing system 300 in FIG. 3.

With reference now to FIG. 5, a diagram of a response to a my-job-submit command is depicted in accordance with a preferred embodiment of the present invention. String 500 is an example of a job ID string sent back to a node submitting a job using the my-job-submit command. This string is also referred to as a resource list and used by a mechanism of the present invention and used to obtain status information about the job. In these examples, this string is created by a globus job manager, which executes the process. The globus job manager is a program or process that executes on the remote node processing the job. Section 502 of string 500 contains a process identifier (PID).

In FIG. 6, a diagram of an entry used for obtaining status information is depicted in accordance with a preferred embodiment of the present invention. Entry 600 is located in file 602. The file name of file 602 represents the name of the remote host in these examples. In these examples, this file is stored in a directory called "$HOME/.globus_job". File 604 is for another host called "<other host>". In this example, entry 600 includes process ID 606 and job ID 608. This information is saved when a job ID string, such as string 500, is returned in response to a my-job-submit command. Next, when a grid process status command is executed, the mechanism of the present invention submits a job called "ps-efl" to obtain process information.

In this example, "ps" is short for process status and "efl" are options for the request for the process status. The ps command prints information about active processes. Without flags, ps prints information about processes associated with the controlling terminal. The output contains the process ID, terminal identifier, cumulative execution time, and the command name. The information displayed with flags varies accordingly. For example, "-e" is an option that writes to standard output information about all processes, except kernel processes; "-f" is an option that generates a full listing; and "-l" is an option that generates a long listing. As mentioned during the nail-pounder example above, this could be any status monitoring program returned by the remote node at job submission time.

In FIG. 7, a diagram of a response containing status information is depicted in accordance with a preferred embodiment of the present invention. Response 700 is an example of a response returned when a ps-efl job is submitted. The global process status command formats the returned information for display for each process ID.

Turning now to FIG. 8, an example of a display of job status information is depicted in accordance with a preferred embodiment of the present invention. In this example, display 800 displays information for a single job process. Of course, many job processes may be presented within job 800. In this example, display 800 provides the following fields for each process: F 801, S 802, UID 804, PID 806, PPID 808, C 810, PRI 812, NI 814, ADDR 816, SZ 818, WCHAN 820, STIME 822, TTY 824, TIME 826, and CMD 828. F 801 includes flags (hexadecimal and additive) associated with the process, or the thread if the –L option is specified. S 802 represents the state of the process or kernel thread, and UID 804 is the user ID number of the process. PID 806 represents the process ID for the job. This process ID is unique only to the node on which the process is running. PPID 808 is the process ID of the parent process. Next, C 810 is the CPU utilization of process or thread. This value is incremented each time the system clock ticks and the process or thread is found to be running. The value is decayed by the scheduler by dividing it by 2 once per second. For the sched_other policy, CPU utilization is used in determining process scheduling priority. Large values indicate a CPU intensive process and result in lower process priority whereas small values indicate an I/O intensive process and result in a more favorable priority. The default header for this field is C.

PRI 812 represents the priority of the process or kernel thread. Higher numbers in PRI 812 mean lower priority. NI 814 represents the nice value of the process used in calculating priority for the sched_other policy. ADDR 816 contains the segment number of the process stack, if normal; if a kernel process, the address of the preprocess data area. SZ 818 indicates the size in pages of the core image of the process. WCHAN 820 is the event for which the process or kernel thread is waiting or sleeping. For a kernel thread, this field is blank if the kernel thread is running. For a process, the wait channel is defined as the wait channel of the sleeping kernel thread if only one kernel thread is sleeping; otherwise a star is displayed.

STIME 822 represents the starting time of the process. The LANG environment variables control the appearance of this field. TTY 824 is the controlling workstation for the process: "–" means the process is not associated with a workstation, and "?" means the workstation is unknown. TIME 826 indicates the total execution time for the process. CMD 828 contains the command name. The full command name and its parameters are displayed in this illustration.

Further, in addition to presenting the information visually, other types of presentations may be used. For example, other information may be presented audibly over a speaker.

Figure 9:
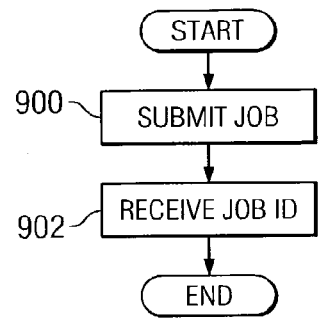
FIG. 9 is a flowchart of a process for submitting a job in accordance with a preferred embodiment of the present invention.

Turning next to FIG. 9, a flowchart of a process for submitting a job is depicted in accordance with a preferred embodiment of the present invention. This process is an example of a process initiated when a my-job-submit command is used. The process illustrated in FIG. 9 may be implemented in a node, such as node 400 in FIG. 4.

The process begins by submitting a job for processing by a remote resource, step 900. This job is submitted using the my-job-submit command. A return string is received (step 902). From this return string, a process ID and a job ID are saved (step 904), with the processing terminating thereafter. This information is saved in a file, such as file 602 in FIG. 6, for use in obtaining status information on remote nodes. If a job terminates, the PID is not reported in response to a ps command. If the job completes, a completion is reported.

Figure 10:
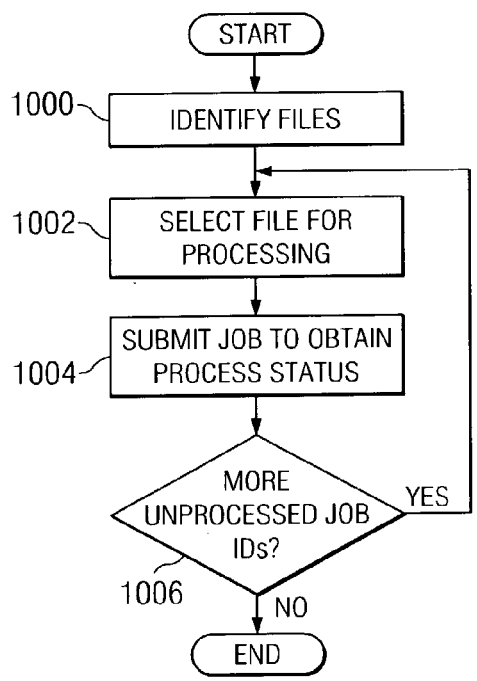
FIG. 10 is a flowchart of a process for processing a status command in accordance with a preferred embodiment of the present invention.

Turning next to FIG. 10, a flowchart of a process for processing a status command is depicted in accordance with a preferred embodiment of the present invention. The process illustrated in FIG. 10, is initiated in response to the execution of a grid status process command. The steps, illustrated in this figure, show the portion of a grid process status command that submits requests for status information. This process may be executed on a node, such as node 400 in FIG. 4.

The process begins by identifying files (step 1006). These files are identified in a director or folder, in which files for processes are stored. These files may be, for example, files 602 and 604 in FIG. 6. Thereafter, one of the identified files is selected for processing (step 1002). Thereafter, a job is submitted to obtain the process status (step 1004). Next, a determination is made as to whether additional unprocessed files are present (step 1006). If additional files are present, the process returns to step 1002 as described above, otherwise, the process terminates.

Figure 11:
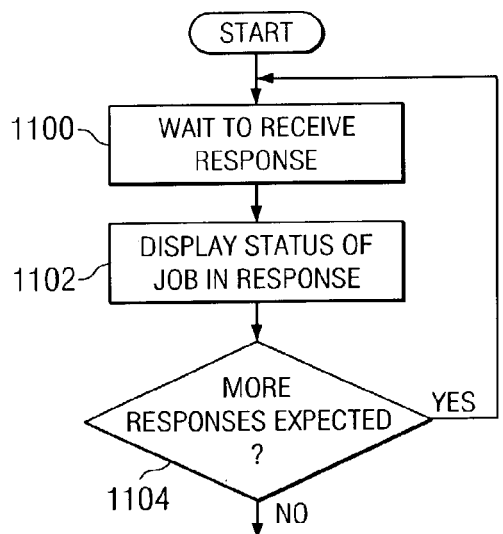
FIG. 11 is a flowchart of a process used for processing returned status information in accordance with a preferred embodiment of the present invention.

With reference now to FIG. 11, a flowchart of a process used for processing returned status information is depicted in accordance with a preferred embodiment of the present invention. The process illustrated in FIG. 11, illustrates steps used by a grid status process command when status information on processes are returned.

The process begins by waiting to receive a response, (step 1100). When a response is received, this response is presented in a display, such as display 800 in FIG. 8 (step 1102). The process then determines whether more responses are expected (step 1104). If more responses are expected, the process returns to step 1100. Otherwise, the process terminates.

Turning next to FIG. 12, a diagram illustrating pseudo code for a my-job-submit command is depicted in accordance with a preferred embodiment of the present invention. Code 1200 is an example of a code in shell command or shell script. Code 1200 submits the jobs needed and will save the return strings for use in obtaining status information at a later time.

With reference to FIG. 13, a diagram illustrating pseudo code for a grid process status command is depicted in accordance with a preferred embodiment of the present invention. Code 1300 is an example of a code in shell command or shell script In this example, code 1300 implements processed used to identify jobs currently being processed.

Thus, the present invention provides a method, apparatus, and computer instructions for obtaining status information for processes executing on remote nodes. The mechanism of the present invention provides an ability for a user at a node to obtain information about processes executing on remote nodes. This mechanism does not require changes or modifications to processes or services to remote to the client or node on which the status commands are executed.

The mechanism of the present invention provides a new job-submit-command, my-job-submit, which submits the job and saves the return string for use in obtaining status information. Additionally, the mechanism of the present invention provides a grid process status command, which is used to obtain the status information of jobs on remote nodes using the information saved by the my-job-submit command.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for obtaining status information for processes executing in a grid, the method comprising:
   receiving, by a local node, a first command, wherein the first command is a globus-job-submit command enclosed in a wrapper, and wherein the globus-job-submit command is for submitting a plurality of jobs to be processed;
   creating, by the wrapper, a directory in the local node;
   receiving, by a grid resource application management (GRAM) service node, the plurality of jobs to be processed;
   distributing, by the GRAM service node, the plurality of jobs to a plurality of remote nodes to execute the plurality of jobs;
   returning, to the local node by the globus-job-submit command, a return string that includes a particular job identifier and a particular host name for each one of the plurality of jobs being executed by each one of the plurality of remote nodes, wherein the particular host name identifies one of the plurality of remote nodes that is executing a particular job identified by the particular job identifier;
   reading, by the wrapper from the return string, the particular job identifier and the particular host name for each one of the plurality of jobs; and
   storing, by the wrapper, the particular job identifier and the particular host name for each one of the plurality of jobs in a separate file in the directory.

2. The method of claim 1, wherein each job identifier is a unique identifier.

3. The method of claim 1, wherein the status of each one of the plurality of jobs is presented using at least one of a display screen and a speaker.

4. The method of claim 1, wherein the job identifier for each one of the plurality of jobs is received in a string that was created by a globus job manager.

5. The method of claim 1, wherein the return string is a return resource specification definition language (RSL) string.

6. The method of claim 1, wherein the globus-job-submit command is a Globus Toolkit command.

7. The method of claim 1, wherein the globus-job-submit command is a batch interface and is submitted to the GRAM service node from the local node.

8. The method of claim 1, wherein the wrapper is initiated only in response to the receipt of the first command by the local node, and wherein the globus-job-submit command does not cause the wrapper to perform the creating, reading, and storing.

9. The method of claim 1, wherein the first command includes the globus-job-submit command and the wrapper.

10. The method of claim 1, wherein the globus-job-submit command is included in a wrapper routine.

11. The method of claim 1, further comprising:
    while each one of the plurality of jobs is still being executed, submitting a third UNIX command to obtain a current status of each one of the plurality of jobs;
    reading, by the third UNIX command, each file in the directory;
    for each file in the directory: issuing, by the third UNIX command, a remote job to one of the plurality of remote nodes identified by a specific host name identified in the file to obtain a current status about a specific one of the plurality of jobs identified in the file, wherein the one of the plurality of remote nodes is processing the specific one of the plurality of jobs.

12. The method of claim 11 further comprising:
    removing a job identifier from the directory for a completed one of the plurality of jobs if a current status of the completed one of the plurality of jobs indicates that the completed one of the plurality of jobs is done.

13. The method of claim 11, wherein the third UNIX command is generated in response to at least one of a user input and a periodic event.

14. The method of claim 11, further comprising:
    presenting the current status of each specific one of the plurality of jobs identified in each file in the directory.

15. The method of claim 11, wherein the third UNIX command is a process status "ps" UNIX command.

16. A data processing system for obtaining status information for processes executing in a grid, the data processing system comprising:
    a local node receiving a first command, wherein the first command is a globus-job-submit command enclosed in a wrapper, wherein the globus-job-submit command is for submitting a plurality of jobs to be processed;
    a processor executing the wrapper to create a directory in the local node;
    a grid resource application management (GRAM) service node receiving the plurality of jobs to be processed;
    the GRAM service node distributing the plurality of jobs to a plurality of remote nodes to execute the plurality of jobs;
    the local node receiving a return string, from the globus-job-submit command, that includes a particular job identifier and a particular host name for each one of the plurality of jobs being executed by each one of the plurality of remote nodes, wherein the particular host name identifies one of the plurality of remote nodes that is executing a particular job identified by the particular job identifier;
    the processor executing the wrapper to read from the return string the particular job identifier and the particular host name for each one of the plurality of jobs; and
    the processor executing the wrapper to store the particular job identifier and the particular host name for each one of the plurality of jobs in a separate file in the directory.

17. The data processing system of claim 16, wherein the globus-job-submit command is a batch interface and is submitted to the GRAM service node from the local node.

18. The data processing system of claim 16, wherein the wrapper is initiated only in response to the receipt of the first command by the local node, and wherein the globus-job-submit command does not cause the wrapper to perform the creating, reading, and storing.

19. The data processing system of claim 16, wherein the first command includes the globus-job-submit command and the wrapper.

20. The data processing system of claim 16, wherein the globus-job-submit command is included in a wrapper routine.

21. A computer program product that is stored in a computer-recordable medium and executed by a processor for obtaining status information for processes executing in a grid, the computer program product comprising:
   computer usable program code for receiving, by a local node, a first command, wherein the first command is a globus-job-submit command enclosed in a wrapper, wherein the globus-job-submit command is for submitting a plurality of jobs to be processed;
   computer usable program code for creating, by the wrapper, a directory in the local node;
   computer usable program code for receiving, by a grid resource application management (GRAM) service node, the plurality of jobs to be processed;
   computer usable program code for distributing, by the GRAM service node, the plurality of jobs to a plurality of remote nodes to execute the plurality of jobs;
   computer usable program code for returning, to the local node by the globus-job-submit command, a return string that includes a particular job identifier and a particular host name for each one of the plurality of jobs being executed by each one of the plurality of remote nodes, wherein the particular host name identifies one of the plurality of remote nodes that is executing a particular job identified by the particular job identifier;
   computer usable program code for reading, by the wrapper from the return string, the particular job identifier and the particular host name for each one of the plurality of jobs; and
   computer usable program code for storing, by the wrapper, the particular job identifier and the particular host name for each one of the plurality of jobs in a separate file in the directory.

22. The computer program product of claim 21, further comprising:
   computer usable program code for submitting a third UNIX command to obtain a current status of each one of the plurality of jobs while each one of the plurality of jobs is still being executed;
   computer usable program code for reading, by the third UNIX command, each file in the directory;
   for each file in the directory: computer usable program code for issuing, by the third UNIX command, a remote job to one of the plurality of remote nodes identified by a specific host name identified in the file to obtain a current status about a specific one of the plurality of jobs identified in the file, wherein the one of the plurality of remote nodes is processing the specific one of the plurality of jobs.

23. The computer program product of claim 22, further comprising:
   computer usable program code for presenting the current status of each specific one of the plurality of jobs identified in each file in the directory.

24. The computer program product of claim 22 further comprising:
   computer usable program code for removing a job identifier from the directory for a completed one of the plurality of jobs if a current status of the completed one of the plurality of jobs indicates that the completed one of the plurality of jobs is done.

25. The computer program product of claim 21, wherein the status of each one of the plurality of jobs is presented using at least one of a display screen and a speaker.

26. The computer program product of claim 21, wherein the job identifier for each one of the plurality of jobs is received in a string that was created by a globus job manager.

27. The computer program product of claim 21, wherein the return string is a return resource specification definition language (RSL) string.

28. The computer program product of claim 21, wherein the globus-job-submit command is a Globus Toolkit command.

29. The computer program product of claim 21, wherein the globus-job-submit command is a batch interface and is submitted to the GRAM service node from the local node.

30. The computer program product of claim 21, wherein the wrapper is initiated only in response to the receipt of the first command by the local node, and wherein the globus-job-submit command does not cause the wrapper to perform the creating, reading, and storing.

31. The computer program product of claim 21, wherein the first command includes the globus-job-submit command and the wrapper.

32. The computer program product of claim 21, wherein the globus-job-submit command is included in a wrapper routine.

* * * * *